(12) United States Patent
Li et al.

(10) Patent No.: US 11,789,701 B2
(45) Date of Patent: Oct. 17, 2023

(54) CONTROLLING CARRY-SAVE ADDERS IN MULTIPLICATION

(71) Applicant: Arm Limited, Cambridge (GB)

(72) Inventors: Tai Li, Cambridge (GB); Jack William Derek Andrew, Cambridge (GB); Michael Alexander Kennedy, Cambridge (GB)

(73) Assignee: Arm Limited, Cambridge (GB)

( * ) Notice: Subject to any disclaimer, the term of this patent is extended or adjusted under 35 U.S.C. 154(b) by 550 days.

(21) Appl. No.: 16/985,447

(22) Filed: Aug. 5, 2020

(65) Prior Publication Data

US 2022/0043631 A1 Feb. 10, 2022

(51) Int. Cl.
  *G06F 7/53* (2006.01)
  *G06F 7/544* (2006.01)
(52) U.S. Cl.
  CPC .......... *G06F 7/5443* (2013.01); *G06F 7/5312* (2013.01)
(58) Field of Classification Search
  CPC .................. G06F 7/523; G06F 7/53; G06F 7/5312–5318; G06F 7/5443
  See application file for complete search history.

(56) References Cited

U.S. PATENT DOCUMENTS

| | | | |
|---|---|---|---|
| 5,442,576 A | 8/1995 | Gergen et al. | |
| 5,625,836 A | 4/1997 | Barker et al. | |
| 5,717,944 A | 2/1998 | Wilkinson et al. | |
| 6,615,229 B1 * | 9/2003 | Vijayrao | G06F 7/5324 708/629 |
| 7,216,217 B2 | 5/2007 | Hansen et al. | |
| 9,268,528 B2 * | 2/2016 | Tannenbaum | G06F 7/523 |
| 10,140,090 B2 | 11/2018 | Klein et al. | |
| 10,409,592 B2 | 9/2019 | Burgess et al. | |
| 10,846,056 B2 | 11/2020 | Kennedy et al. | |
| 2004/0210616 A1 | 10/2004 | Debes et al. | |
| 2004/0267855 A1 | 12/2004 | Shantz et al. | |
| 2004/0267857 A1 | 12/2004 | Abel et al. | |
| 2005/0187998 A1 | 8/2005 | Zheng et al. | |
| 2007/0192399 A1 | 8/2007 | Krithivasan et al. | |
| 2011/0231460 A1 * | 9/2011 | Ahmed | G06F 7/483 708/211 |
| 2012/0233234 A1 | 9/2012 | Brooks et al. | |

(Continued)

FOREIGN PATENT DOCUMENTS

WO 99/21078 4/1999

OTHER PUBLICATIONS

Wikipedia—"Booth's multiplication algorithm", retrieved Apr. 3, 2018, 4 pages.

(Continued)

*Primary Examiner* — Matthew D Sandifer
(74) *Attorney, Agent, or Firm* — NIXON & VANDERHYE P.C.

(57) ABSTRACT

A multiplier circuit is provided to multiply a first operand and a second operand. The multiplier circuit includes a carry-save adder network comprising a plurality of carry-save adders to perform partial product additions to reduce a plurality of partial products to a redundant result value that represents a product of the first operand and the second operand. A number of the carry-save adders that is used to generate the redundant result value is controllable and is dependent on a width of at least one of the first operand and the second operand.

17 Claims, 16 Drawing Sheets

(56) References Cited

U.S. PATENT DOCUMENTS

| | | | |
|---|---|---|---|
| 2015/0169289 A1* | 6/2015 | Tannenbaum | G06F 7/4876 |
| | | | 708/503 |
| 2020/0057609 A1 | 2/2020 | Kennedy et al. | |
| 2020/0371749 A1* | 11/2020 | Kennedy | G06F 7/5272 |

OTHER PUBLICATIONS

U.S. Appl. No. 16/105,066, filed Aug. 20, 2018, Kennedy et al.
Office Action for U.S. Appl. No. 16/105,066, dated Apr. 8, 2020, 9 pages.
U.S. Appl. No. 17/698,166, filed Mar. 18, 2022, Pfister et al.
U.S. Appl. No. 18/129,973, filed Apr. 3, 2023, Pfister.

* cited by examiner

| h | n(h) | h | n(h) | h | n(h) |
|---|---|---|---|---|---|
| 0 | 2 | 7 | 28 | 14 | 474 |
| 1 | 3 | 8 | 42 | 15 | 711 |
| 2 | 4 | 9 | 63 | 16 | 1066 |
| 3 | 6 | 10 | 94 | 17 | 1599 |
| 4 | 9 | 11 | 141 | 18 | 2398 |
| 5 | 13 | 12 | 211 | 19 | 3597 |
| 6 | 19 | 13 | 316 | 20 | 5395 |

CONTROLLING CARRY-SAVE ADDERS IN MULTIPLICATION

TECHNICAL FIELD

The present disclosure relates to data processing.

DESCRIPTION

One way to perform multiplication of an operand a by an operand b in a data processing apparatus is by performing 'long hand multiplication', which results in a set of partial products that have to be added together in order to form the final product. However, this can result in a large number of partial products that have to be added together using chains of carry-save adders. Such chains can result in tight timing paths and so it would be desirable if these can be reduced where possible.

SUMMARY

Viewed from a first example configuration, there is provided a multiplier circuit to multiply a first operand and a second operand, the multiplier circuit comprising: a carry-save adder network comprising a plurality of carry-save adders to perform partial product additions to reduce a plurality of partial products to a redundant result value that represents a product of the first operand and the second operand, wherein a number of the carry-save adders that is used to generate the redundant result value is controllable and is dependent on a width of at least one of the first operand and the second operand.

Viewed from a second example configuration, there is provided a method of multiplying a first operand and a second operand, the method comprising: performing partial product additions to reduce a plurality of partial products to a redundant result value that represents a product of the first operand and the second operand, wherein a number of the partial product additions that is used to generate the redundant result value is controllable and is dependent on a width of at least one of the first operand and the second operand.

Viewed from a third example configuration, there is provided a multiplier circuit to multiply a first operand and a second operand, the multiplier circuit comprising: means for performing partial product additions to reduce a plurality of partial products to a redundant result value that represents a product of the first operand and the second operand, wherein a number of the means for performing partial product additions that is used to generate the redundant result value is controllable and is dependent on a width of at least one of the first operand and the second operand.

BRIEF DESCRIPTION OF THE DRAWINGS

The present invention will be described further, by way of example only, with reference to embodiments thereof as illustrated in the accompanying drawings, in which:

FIG. 4 is a table that shows a relationship between number of elements to be added and required height of a CSA network;

DESCRIPTION OF EXAMPLE EMBODIMENTS

Figure 1:
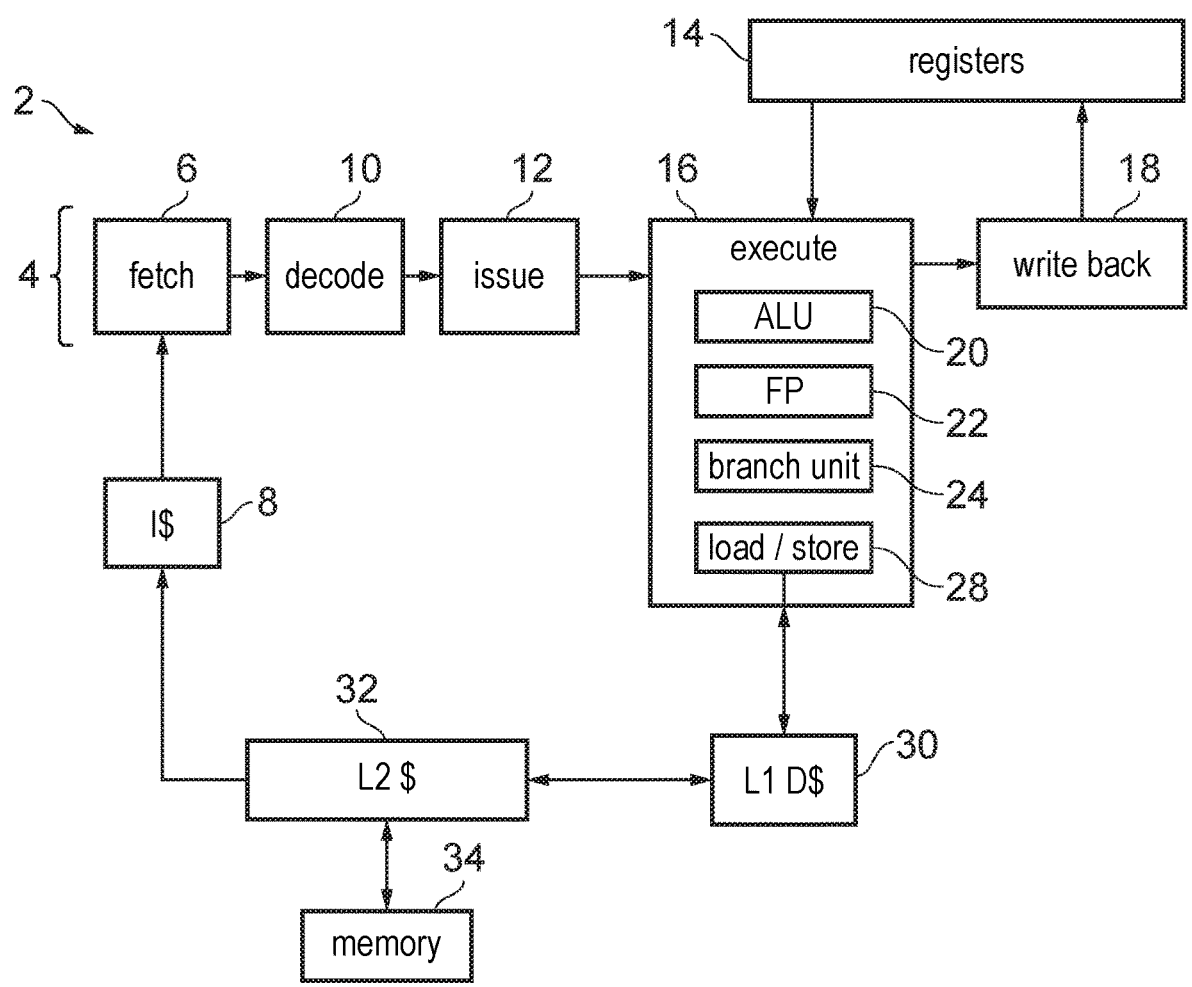
FIG. 1 illustrates an example of a pipeline in a processing apparatus.

Before discussing the embodiments with reference to the accompanying figures, the following description of embodiments is provided.

In accordance with one example configuration there is provided a multiplier circuit to multiply a first operand and a second operand, the multiplier circuit comprising: a carry-save adder network comprising a plurality of carry-save adders to perform partial product additions to reduce a plurality of partial products to a redundant result value that represents a product of the first operand and the second operand, wherein a number of the carry-save adders that is used to generate the redundant result value is controllable and is dependent on a width of at least one of the first operand and the second operand.

Multiplication of two operands can be achieved in circuitry by generating a number of partial products and then adding the partial products together. Each partial product could be, for instance, the result of multiplying one bit of an operand B with the operand A. The number of partial products is therefore dependent on a width of at least one of the operands being multiplied together. The addition can be performed using carry-save adders or carry-propagate adders. In a carry-propagate adder, two values are added together starting at the least significant bits of those values. If the two bits to be added are both '1' then a carry takes place. This takes the form of an additional '1' that is added to the next most significant bits that are added together. It will be appreciated, therefore, that the most significant bit cannot be calculated until all the preceding bits have been calculated since until that time, it is unknown as to whether there will be a carry to be performed for the most significant bit or not. Carry-propagate adders are therefore slow. This problem can be solved by using carry-save adders, which are able to add together three inputs to produce two outputs—a carry value and a save value. The carry value indicates, for each respective bit position of the three values, whether a carry is to be performed. Meanwhile, the save value indicates, for each respective bit value of the three values, the final bit value for that position. Since no value is carried between the bits, each bit position can be calculated in parallel and so the carry-save adder operates more quickly. For adding together a large number of values, this results in a tree or network of carry-save adders. For instance, to add 20 values, such a network might comprise eighteen carry-save adders spread across seven layers. In practice, however, such a tree of carry-save adders can be slow to add all the values together. Furthermore, depending on the width of the operands, e.g. the number of bits taken to represent the operands, the number of partial products might be reduced. As a consequence, many of the carry-save adders may effectively be adding null (e.g. zero) inputs—thereby slowing down the addition process unnecessarily. Hence, by controlling how many of the carry-save adders that are used depending on the width, the speed with which the multiplication can be performed can be improved.

In some examples, the carry-save adder network comprises a first set of the carry-save adders and a second set of the carry-save adders; and the number of the carry-save adders that is used to generate the redundant result value is controllable by which of the first set of the carry-save adders and the second set of the carry-save adders to use to generate the redundant result value. The first set of carry-save adders and the second set of carry-save adders need not have different numbers of carry-save adders to each other. For instance, in some embodiments, one or both of the sets of carry-save adders could be used in dependence on the width. In other embodiments, the first set of carry-save adders and the second set of carry-save adders are differently sized and which of these is used depends on the width.

In some examples, the multiplier circuit comprises: combination circuitry to selectively combine a first output from the first set of the carry-save adders and a second output from the second set of the carry-save adders, in dependence on the width of the at least one of the first operand and the second operand, wherein the first set of the carry-save adders and the second set of the carry-save adders are adapted to operate in parallel with each other. In these examples, for certain inputs (e.g. for certain first operands and/or second operands), the two sets of carry-save adders operate in parallel and the outputs from those two sets of carry-save adders are combined in order to produce the result value. In other situations, e.g. for particular widths, only one of the sets of carry-save adders might be used.

In some examples, the second set of the carry-save adders is used to generate the redundant result value regardless of the width of the at least one of the first operand and the second operand; and the first set of the carry-save adders is used to generate the redundant result value in dependence on the width of the at least one of the first operand and the second operand. In these examples, some of the carry-save adders are used for all widths of operands, while the other carry-save adders are used for particular widths of operands. The number of carry-save adders can thus be controlled by whether the first set of carry-save adders is used or not.

In some examples, the multiplier circuit comprises: selection circuitry to receive a first candidate redundant result value from the first set of the carry-save adders and a second candidate redundant result value from the second set of the carry-save adders and to select between the first candidate redundant result value and the second candidate redundant result value as the redundant result value. In these examples, two completely independent paths can be used, depending on the width of the input parameters (operands). For instance, one path might be used for operands of one width and could have a smaller number of CSAs. A second path might be used for operands of a different width and could have a larger number of CSAs. The selection circuitry then selects whichever output is provided to it first.

In some examples, the multiplier circuit comprises: power control circuitry to disable the first set of the carry-save adders to control the number of the carry-save adders that is used to generate the redundant result value. Rather than using both the first set of carry-save adders and the second set of carry-save adders each time, the multiplier circuit can use power control circuitry to disable or cause one of the sets of carry-save adders to enter a low power/sleep mode when unused (e.g. when the width of the operands is such that the use of that set is not necessary).

In some examples, the number of the carry-save adders that is used to generate the redundant value reduces as the width of the at least one of the first operand and the second operand reduces. The number of carry-save adders used need not be linearly dependent on the width. For instance, the relationship could be a logarithmic relationship in which increasingly large widths are needed to increase the number of carry-save adders that are used by one. In some examples, the relationship is not precise. For instance, in some examples, a smaller number of carry-save adders is used for smaller widths than for larger widths.

In some examples, the plurality of carry-save adders used to generate the redundant value are arranged in the carry-save network as a plurality of serialised chains; and a length of the serialised chains reduces as the width of the at least one of the first operand and the second operand reduces. Each carry-save adder reduces three inputs to two outputs (a carry value and a sum value). A network of carry-save adders can therefore be arranged as a 'tree' made up of 'layers' so as to reduce a large number of inputs down to two outputs, with the outputs of (all but the final one of) the carry-save adders being provided as inputs to other carry-save adders. This results in a number of 'chains' of serialised carry-save adders. Since the carry-save adders within a particular layer of the tree can operate in parallel, the time taken to add together all of the input values will be dependent on the length of the chains (or the number of layers) in the tree. In these examples, it is not only the number of carry-save adders that varies, but also the number of layers (or length of the serialized chains) that is reduced. This in turn reduces the time taken to perform the multiplication.

In some examples, the multiplier circuit is a shared multiplier circuit to perform multiplication on both integers and at least part of floating-point numbers. Floating-point numbers separate the mantissa (which is stored as an integer) and the exponent (which controls placement of the decimal point). For multiplication, these two components are handled separately. Since the mantissa is stored as an integer, multiplication for the mantissa can be achieved by using the same circuitry as is used for integer multiplication.

In some examples, when the at least one of the first operand and the second operand comprises a mantissa of a floating-point number, the number of the carry-save adders is smaller than when both the first operand and the second operand are integers. The timing for floating-point multiplication is much tighter than for integer multiplication because having generated the partial products and having added the partial products together, further steps are performed (e.g. rounding) in order to create the final product as a floating-point number. In practice, the number of bits used to represent a mantissa is often smaller than for an integer. For instance, a single precision floating-point number has a mantissa of 24 bits while a half precision floating-point number has a mantissa of 11 bits and these are less than the number of bits used in a 32-bit or 16-bit multiplier respectively. By providing shared circuitry in which the number of CSAs that are used can be controlled, it is possible to take advantage of the smaller number of partial products that are generated in order to use fewer CSAs and thereby complete the multiplication more quickly. This therefore provides more flexibility in meeting the timing constraints for floating-point multiplication.

In some examples, the multiplier circuit is a SIMD multiplier circuit to perform multiplications between a vector of first operands including the first operand and a vector of second operands including the second operand, to produce a plurality of redundant result values including the redundant result value; and a subset of the partial products relate to a product of one element of the vector of first operands and one element of the vector of second operands. A Single Instruction Multiple Data (SIMD) circuit enables a single instruction to be simultaneously performed on a number of items of data. This parallelism can lead to faster processing where the same instruction to be performed multiple times. In a SIMD multiplier circuit, it is possible to variably control the number of operands that are multiplied together. For instance, a 64-bit SIMD multiplier circuit can be used to multiply either one 32-bit integer by another 32-bit integer, two 16-bit integers by other 16-bit integers, or four 8-bit integers by other 8-bit integers. A pair of 64-bit SIMD multiplier circuits can also be provided in order to perform the multiplication of a 64-bit integer by another 64-bit integer and by separating the process into two 32×32 bit multiplications.

In some examples, the multiplier circuit is a SIMD multiply accumulate circuit; and results of the multiplications are added together. A multiply accumulate operation is one in which the result of each multiplication is added together. For instance, a multiply accumulate operation might perform (a*b)+(c*d)+(e*f).

In some examples, the results of the multiplications are bit-aligned with each other such that the results are stacked. Multiply-accumulate operations can be performed using SIMD circuitry by 'stacking' the partial products in a particular manner. In these examples, sets of partial products are added together in order to provide a result of one of the multiplications. The results are bit-aligned and each of the results can be added together. In practice, stacking the results in this way increases the number of partial products that are generated. An additional partial product is generated for the result of each multiplication. This can involve a larger network of CSAs being provided, which in turn lengthens the time taken to perform addition of the partial products (and therefore the multiplication operation as a whole). By controlling the extent to which the CSAs are used, it is possible to provide greater improvements in the execution time for multiplication where a large number of CSAs is not required (such as for floating-point multiplication).

In some examples, the multiplier circuit comprises: a carry-propagate adder to convert the redundant result to a non-redundant result. As previously explained, the network of CSAs will eventually produce a pair of values in redundant (carry-save) representation. A carry-propagate adder can be provided at the end in order to convert the redundant representation into non-redundant representation.

In some examples, each of the partial products represents a product of one element of the first operand with one element of the second operand. The element could be a bit, for instance, as previously described. Such an operation could be described as a radix-2 multiplication operation (radix-2 utilising 2 values for each 'digit' or 'element). In other examples, radix-4 might be used where pairs of bits are considered. The use of a higher radix will generally decrease the number of partial products that are generated. However, the circuitry required to perform the multiplications to generate the partial products could be slower and/or more complicated as a result.

In some examples, there is provided a data processing apparatus comprising one of the above-mentioned multiplier circuits. The data processing apparatus could take the form of a pipeline, or CPU for instance, or part of a larger device.

Particular embodiments will now be described with reference to the figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetch program instructions to generate micro-operations to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms. In the example of FIG. 1, the multiplier circuit might form part of the ALU 20 and/or could be shared with the FPU.

Figure 2:
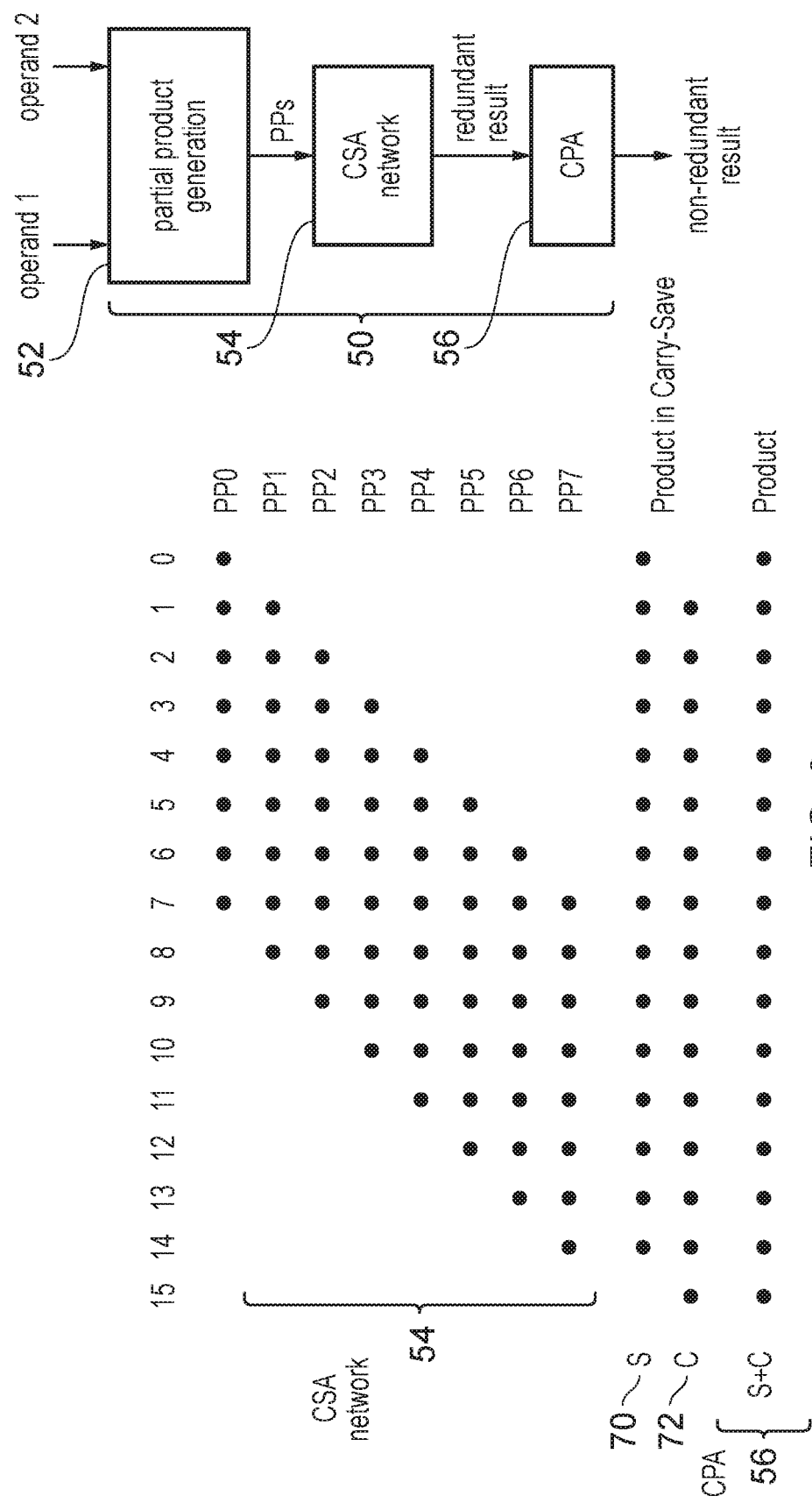
FIG. 2 shows an example of binary multiplication.

The dot diagram in the left hand part of FIG. 2 explains the function of the multiplier circuit, which takes the form of a basic binary encoder. In this example, the multiplication is being performed using radix-2 (one bit per 'digit') and multiplies two 8-bit operands. It will be appreciated that other examples could be provided with a different operand width or a different radix. Each row of the dot diagram labelled PP0 to PP7 represents one of the partial products (PPs) generated by the partial product generation circuitry 52. The partial products can be thought of as the pre-addition results of performing long multiplication. For example, in multiplying a first operand A (01110001) by a second operand B (011110001) using radix-2, the first partial product is the result of multiplying 1 (1 in decimal) by 01110001 (113 in decimal). The second partial product is the result of multiplying 0 by 01110001 and shifting the result to the left by 1. The third partial product is the result of multiplying 0 by 01110001 and shifting the result to the left by 2. The fourth partial product is the result of multiplying 0 by 01110001 and then shifting the result to the left by 3. The fifth partial product is the result of multiplying 1 by 01110001 and then shifting the result to the left by 4 and so on. Note that if radix-4 were used (2 bits per 'digit') the first partial product would be the result of multiplying 01 by 01110001. The second partial product would be the result of multiplying 00 by 01110001 and shifting the result to the left by 2. The third partial product would be the result of multiplying 11 (3 in decimal) by 01110001 and shifting the result to the left by 4, and so on. It will be appreciated, therefore, that the use of a higher radix will decrease the number of partial products that are generated.

In the example of FIG. 2, each dot of a given partial product represents one digit/bit of that partial product and the dots are aligned in columns based on the respective significance of each partial product in comparison to the end result. For example, in this example, each successive partial product may have its most significant bit one bit position to the left of the most significant bit of the preceding partial product.

The carry-save-adder (CSA) network 54 adds together the partial products, considering the relative offsets in magnitude. Each column of dots shown in FIG. 2 represents bit values which are added together to produce a corresponding bit in the final product 56.

While FIG. 2 shows one example of ordering the partial product additions for adding the partial products, it will be appreciated that the order in which these additions are performed need not be from top-to-bottom as shown in FIG. 2. Since addition is an associative operation, it would be possible to perform later rows of addition shown in FIG. 2 first, and then include the carries generated in those additions to the additions associated with earlier rows. Hence, there is freedom to reorder the sequence in which the additions are performed.

By using a network 54 of CSAs, the cost of adding the partial products is lower than if a network of carry-propagate adders (CPAs) had been used for the additions. In particular, a CPA generally starts with the least significant bits and performs addition. If both input bits are '1' then a carry value is propagated to and incorporated into the addition of the next most significant bits and so on. As a consequence of this, the addition proceeds in a serialised manner and the most significant bits are added at the end. In contrast, a CSA deals with the carry bits separately. For bits of a particular significance, two values are output—a sum (the result of adding the bits together) and a carry (if a carry bit is required). Since the carry bits are not passed along, it is possible to process bits of each significance at the same time (e.g. in parallel). The addition therefore proceeds more quickly. Furthermore, the two numbers that are output can be used to represent the addition of any three inputs. CSAs therefore reduce three inputs to two outputs and operate more quickly than CPAs. This use of two terms to represent a single value is referred to as 'redundant representation'.

The final CSA produces two outputs—a sum term 70 and a carry term 72. The sum term 70 and carry term 72 together represent a redundant result in carry-save representation. The sum and carry terms 70, 72 of the redundant result are added using the CPA 56 to generate a non-redundant product result.

Figure 3:
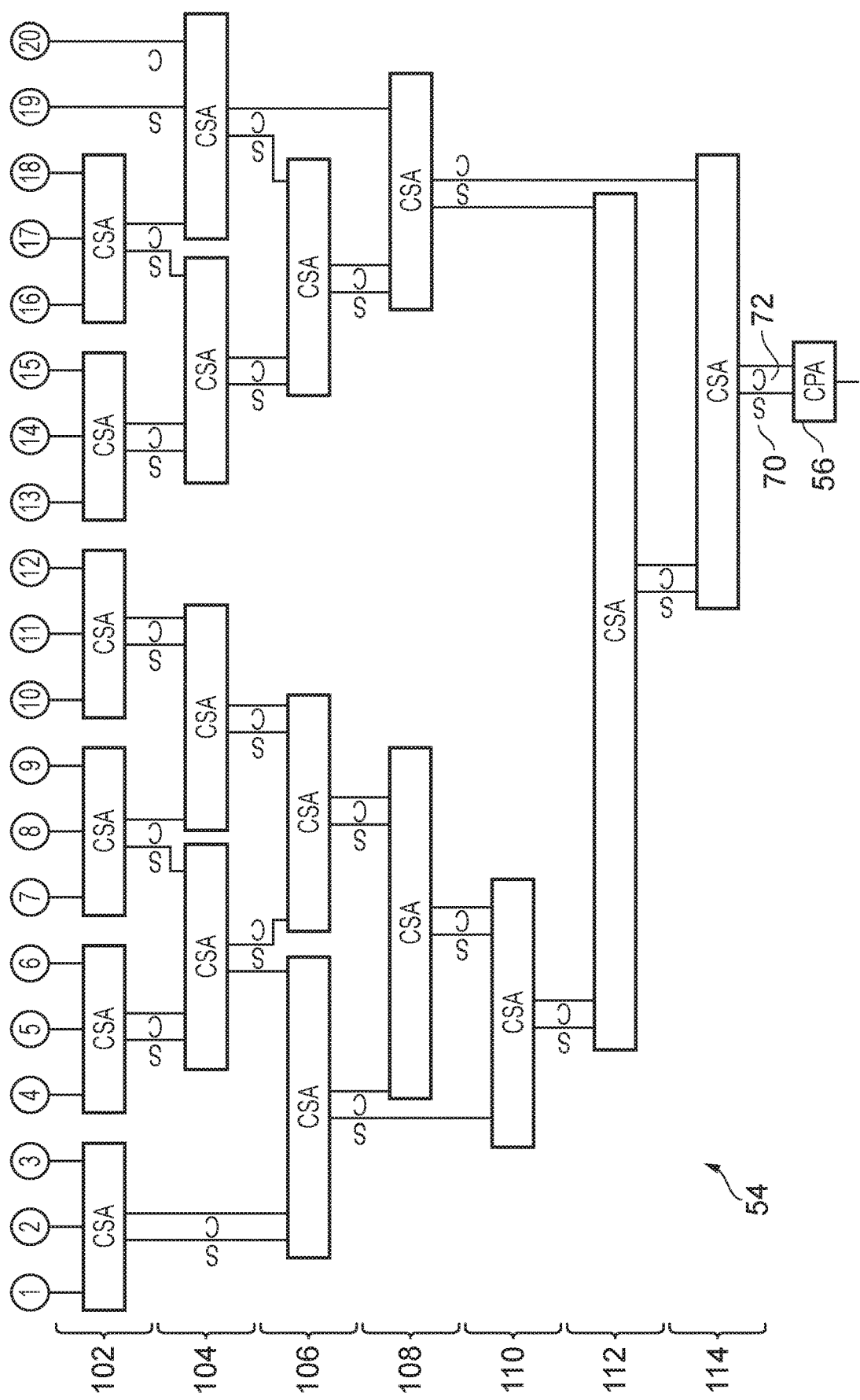
FIG. 3 shows an example of a carry-save adder network for adding 20 operands together.

FIG. 3 illustrates an example arrangement of the CSA network 54. The CSA network 54 is presented as a tree in which twenty input values (e.g. partial products) are combined through a series of chains of serialised CSAs, terminating in the final output in the form of a final sum term 70 and carry term 72. These final terms 70, 72 are passed to a CPA 56 to produce a single final term in non-redundant representation. The network can be thought of as comprising a number of layers 102, 104, 106, 108, 110, 112, 114. Each CSA in each layer reduces three input elements to two output elements, with the outputs of one CSA being provided as inputs to a CSA in another layer until the number of outputs is reduced to two. This results in 20 input elements in the first layer, 14 input elements in the second layer, 10 input elements in the third layer, 7 input elements in the fourth layer, 5 input elements in the fifth layer, 4 input elements in the sixth layer, and 3 input elements in the seventh layer. Each of the CSAs within a layer can operate in parallel. Clearly, as the number of partial products to be added together increases, the size of the tree (and the number of layers) increases.

Since all inputs must pass through the tree to generate the final sum, the time taken to perform the addition is heavily dependent on the length of the serialised CSA chains (e.g. the height of the tree or the number of layers). Meanwhile, the number of partial products is dependent on the width (number of bits) of the operands being multiplied. In the example above, the radix and the size of one of the operands (e.g. B) increases the number of partial products generated. Meanwhile, the size of the other operand affects the size of the partial products. With multiplication being a commutative operation (e.g. a*b=b*a), the order of the operands can be swapped in order to better serve the particular hardware configuration—either to support generating large partial products or a larger number of partial products as desired.

It is desirable to be able to use the same circuitry where possible so as to keep circuitry size and power consumption down. One component of floating-point multiplication involves handling the multiplication of the mantissas, which are represented in integer form. Logically, therefore, the same circuitry can be used. However, the addition of the partial products is often required more quickly for mantissas than for integers because having performed the mantissa multiplication, other operations (such as rounding) are performed before the floating-point multiplication can be completed. Since only a given amount of time is available in each clock cycle, the timing is often considered to be much tighter when performing multiplication in respect of floating-point numbers than in respect of integer numbers. This is true even though mantissas often occupy fewer bits than for an integer. For instance, the mantissa of a single precision floating-point number is 24 bits whereas the mantissa of a half precision floating-point number is 11 bits. As already stated, the same circuitry can be used for multiplying any number of partial products. However, the time taken to perform the addition will still be dependent on the size of the CSA network (e.g. the number of layers or the height of the CSA tree) and not the number of partial products being added. If a smaller number of partial products are being added than the CSA network supports then dummy/null/zero partial products are used to pad the input so as to match the number of inputs supported by the CSA network.

FIG. 4 shows the relationship between the height of the CSA tree h and the number of partial products that can be added together using a tree of that height—n(h). It is clear from FIG. 4 that the relationship between these parameters is logarithmic. In particular, as the height of the tree increases, small increases in the height allow larger and larger numbers of partial products to be added together. For example, increasing the height of the tree from 19 to 20 increases the number of partial products that can be added from 3597 to 5395 (an increase of 1798). However, increasing the height of the tree from 10 to 11 increases the number of partial products that can be added from 94 to 141 (an increase of 47).

Figure 5:
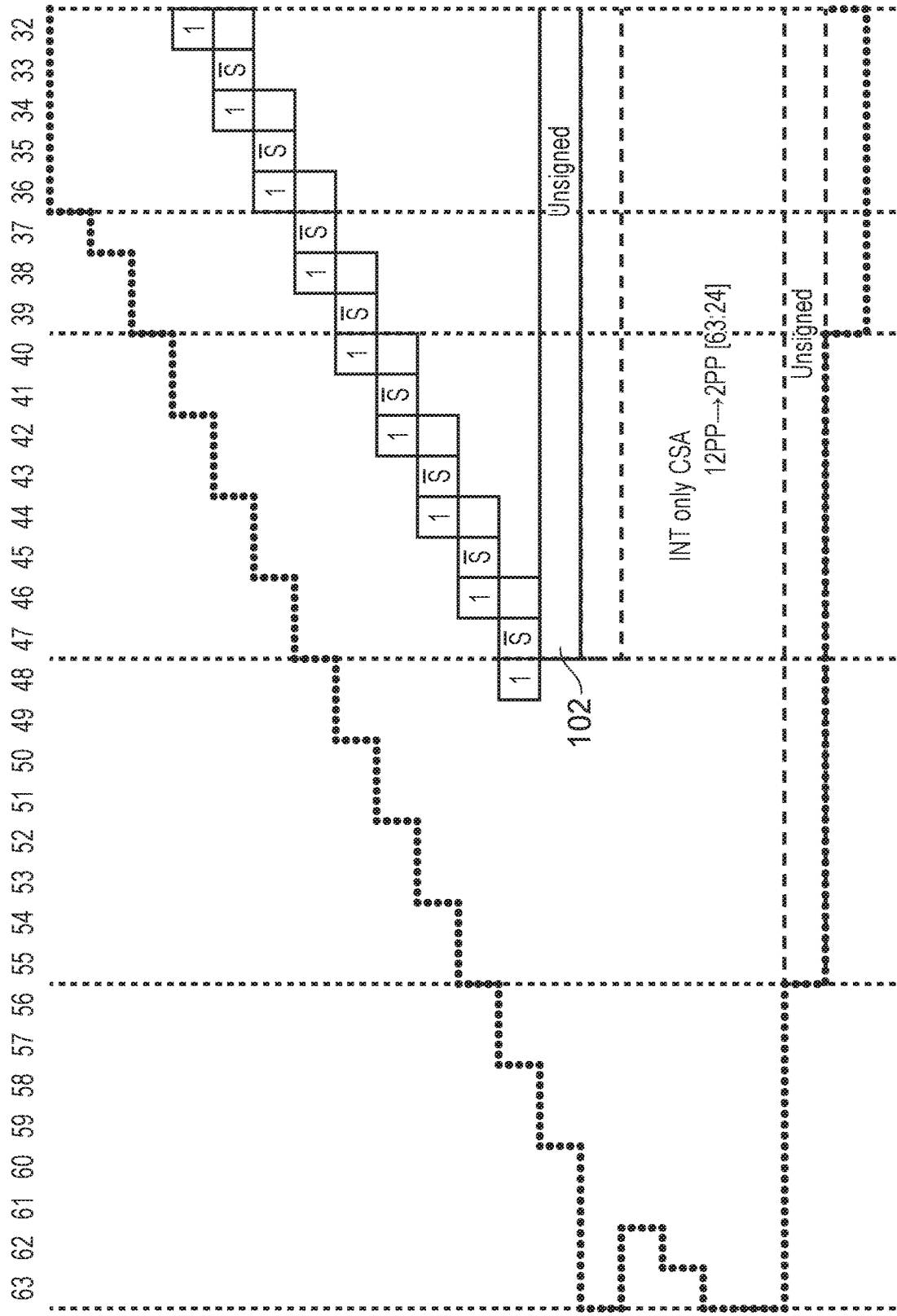
FIG. 5 illustrates the relationship between partial products produced for integer multiplication and floating-point mantissa multiplication.
Figure 5:
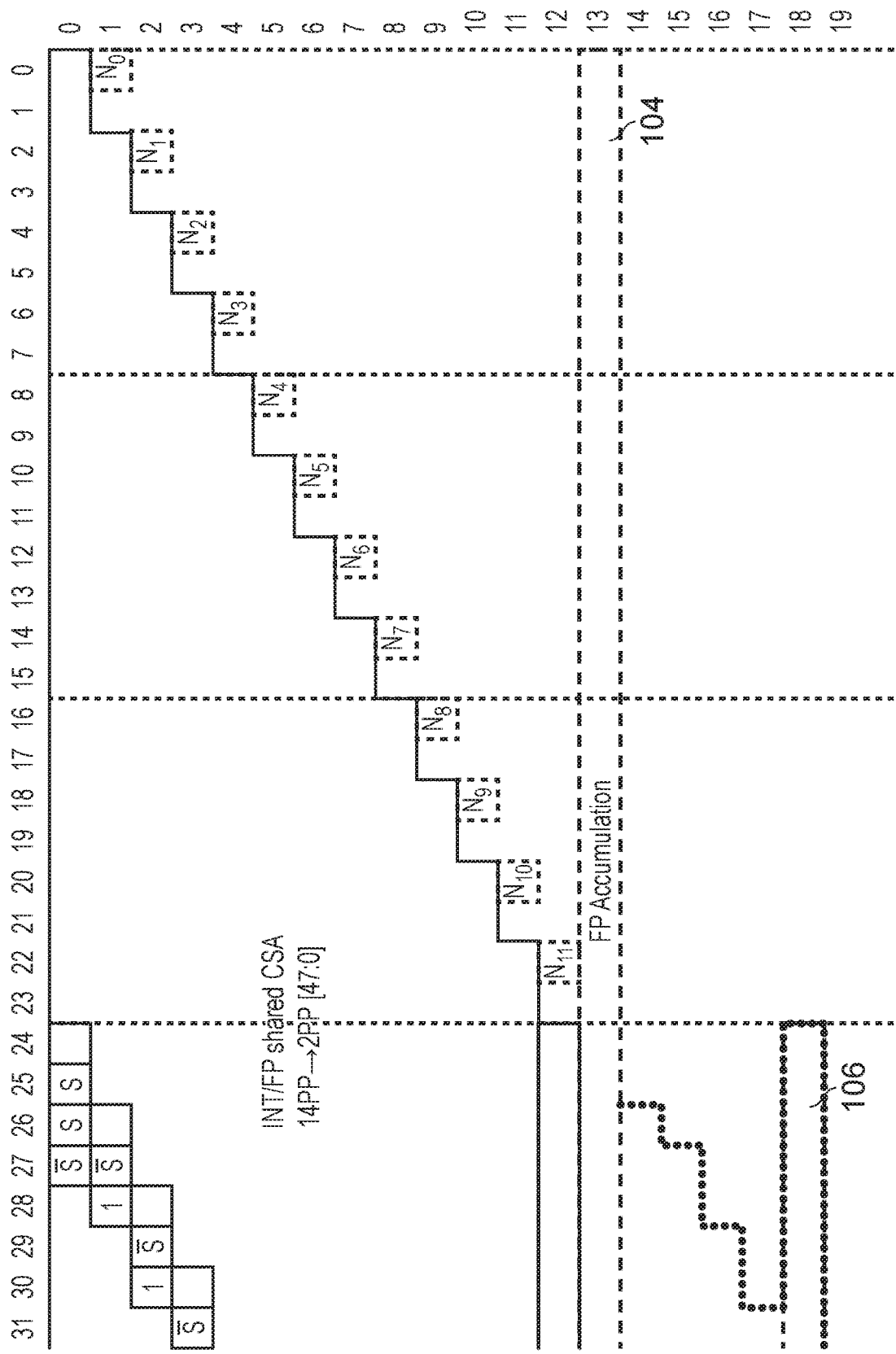

FIG. 5 illustrates the relationship between the partial products generated for mantissa multiplication and also for two 32-bit integer multiplication when using a radix-4 Booth multiplier.

When the multiplication is performed on two 24-bit mantissas, since radix-4 multiplication is being performed, 12 partial products are generated (24/2 bits per 'digit'=12). Note that each of these partial products could be up to 25 bits in length. This derives from the fact that each partial product is generated by multiplying one 24 bit operand (the length of a mantissa in a single precision floating-point number) by two bits of the second operand (2 bits due to the multiplication being radix-4). In theory, this would make the length of each partial product 24+2=26 bits. The two-bit digit could be any one of +0, +1, +2, and +3 (in radix 4), and 26 bits are used for when the second digit is +3. However, in a Booth-2 radix-4 implementation, the second operand is converted from +0, +1, +2, +3 to −1, +0, +1, +2 and thus the +3 case does not occur. In this case, the maximum width occurs when the second operand is +2. Multiplying by 2 is the same as performing a single shift, and so the number of bits required for each partial product becomes 24+1=25 bits.

An extra (13$^{th}$) partial product 102 is provided in order to convert the sum of these partial products into a signed number (as opposed to an unsigned number) and a 14$^{th}$ partial product is provided with which to perform a multiply accumulate operation (e.g. a*b+c, with the 14$^{th}$ partial product being used to represent 'c'). Negation bits $N_x$ can also be inserted in order to negate partial product x (when partial product x is to be made negative), together with sign extension bits '1', 'S' and 'S̄'. Each of the resulting partial products can be added together to produce a FP accumulation 104, which is the result of multiplying two 24-bit floating-point mantissas together.

In contrast, where the multiplication is performed on two 32-bit integers using Booth-2 radix-4, the length of the partial products is 32+1=33 bits, with an additional 3 bits being provided, as for the floating-point case, for sign extension. 16 such partial products are generated (32/2 bits per 'digit'=16) with an extra partial product 106 being provided in order to generate an unsigned product. This therefore not only covers but also exceeds the set of bits that are used to represent the partial products generated from mantissa multiplication.

By performing two separate accumulations, when only a small number of partial products are generated (such as for mantissa multiplication), it is possible to make use of a smaller CSA network. The smaller CSA network makes it possible to generate a result more quickly than would occur with a single shared CSA network that is required to support a larger number of partial products being accumulated.

Figure 6:
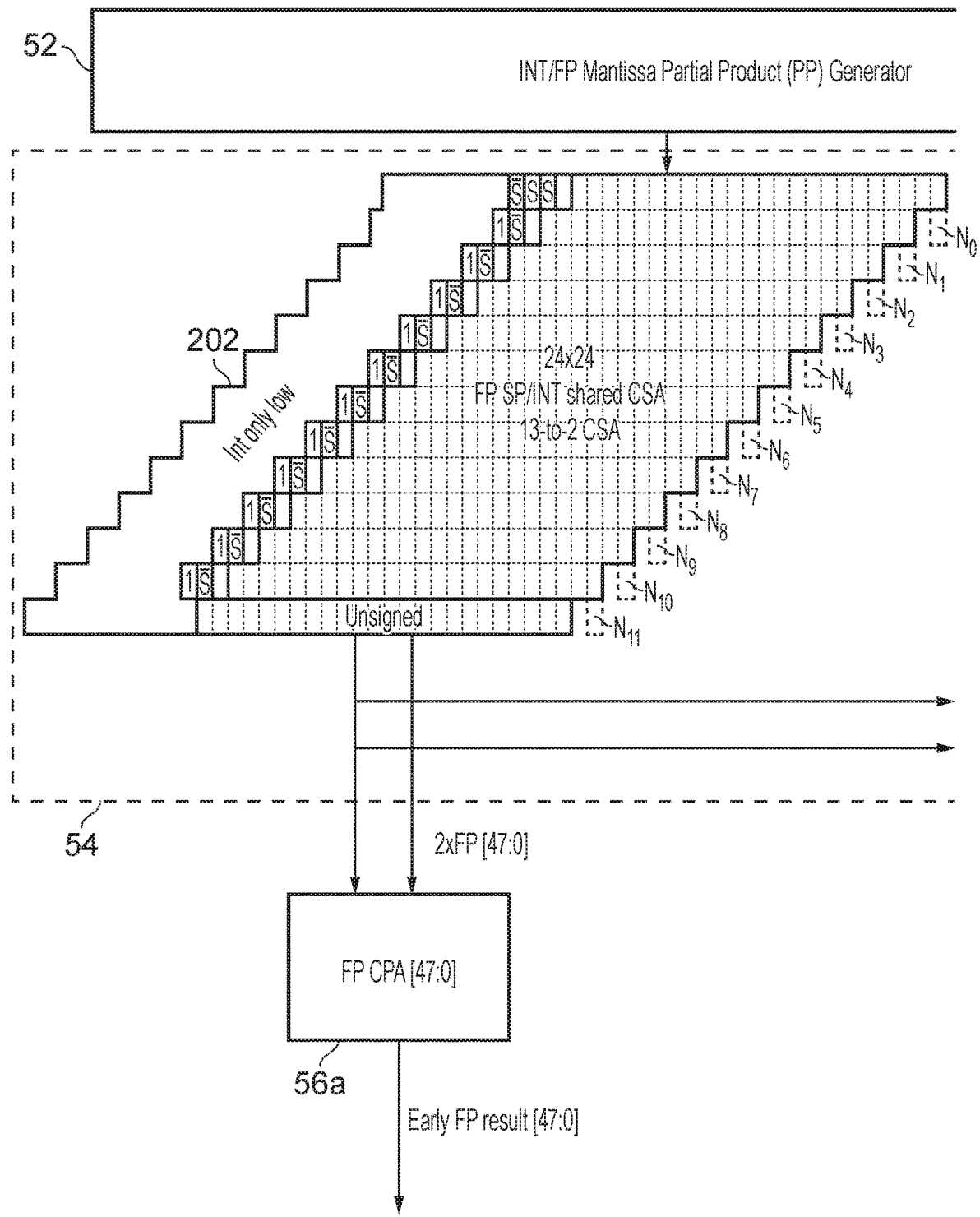
FIG. 6 illustrates a multiplier circuit in accordance with some examples.
Figure 6:
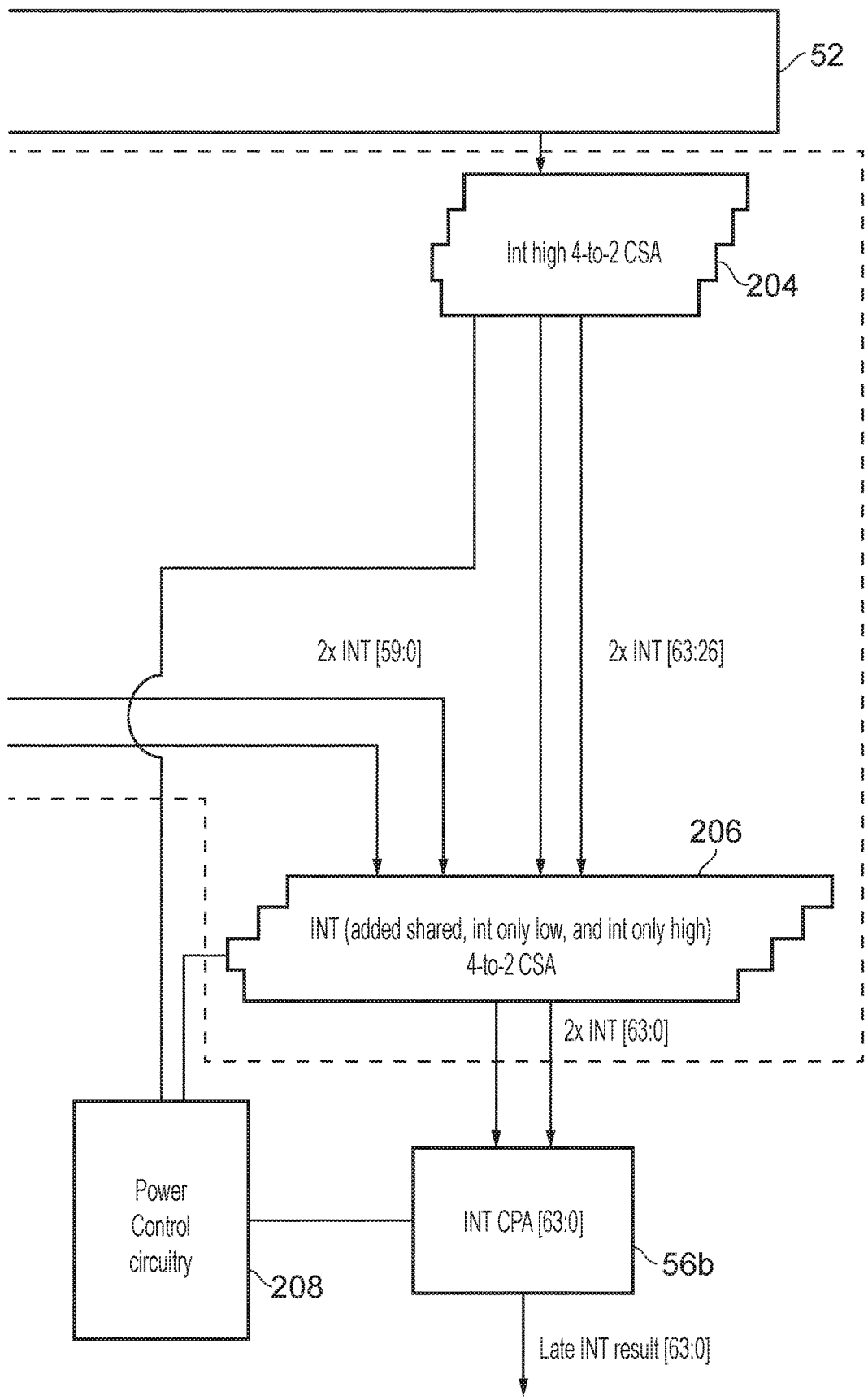

There are a number of ways in which two separate CSA networks can be provided. FIG. 6 illustrates an example in accordance with some embodiments. In this example, a shared CSA network 202 is used regardless of the nature of the operands being multiplied together and a second dedicated CSA network 204 is used when 32-bit integer multiplication is occurring, to add the additional partial products that are generated in 32-bit integer multiplication. Note that the shared CSA 202 also adds some of the bits that are only generated during 32-bit integer multiplication. This is because increasing the size of the partial products (as opposed to the number of partial products) does not affect the number of CSAs used, or the height of the CSA tree. Thus, no additional time is taken to add these larger partial products together. In the case of mantissa multiplication, these extra bits are masked and/or set to 0 so that they have no effect.

When floating-point (e.g. mantissa) multiplication is occurring, the result of the shared CSA network 202 is passed to a CPA 56a to convert the redundantly represented final product into a non-redundantly represented final product Note that in this case, only the lower 48 bits of the redundantly represented result are required (as illustrated in FIG. 5).

Alternatively, if multiplication of larger operands is occurring, such as with 32-bit integer multiplication, then the full set of results (60 bits) is passed, together with the results of the dedicated integer CSA network 204 to a further CSA network 206 to combine these results together. The output is a redundantly represented sum of all the partial products, which can be converted to non-redundant representation using a CPA 56b.

Power control circuitry 208 is also provided in order to cause the integer CSA network 204, the further CSA network 206, and the integer CPA 56b to be powered off (or enter a lower power mode) when not in use.

Note that although only a small CSA network is provided as the dedicated integer CSA network 204, and even though such a network operates in parallel with the shared CSA network 202, the results from these two network are still combined using a 4-2 CSA network 206 when large parameter multiplication (such as integer multiplication) occurs. As indicated in FIG. 4, such a CSA network 206 has a height of 2, and so the smaller operand multiplication (e.g. for floating-point mantissas) is saved the time that it would take for bits to pass through a 2-layer CSA network.

Figure 7:
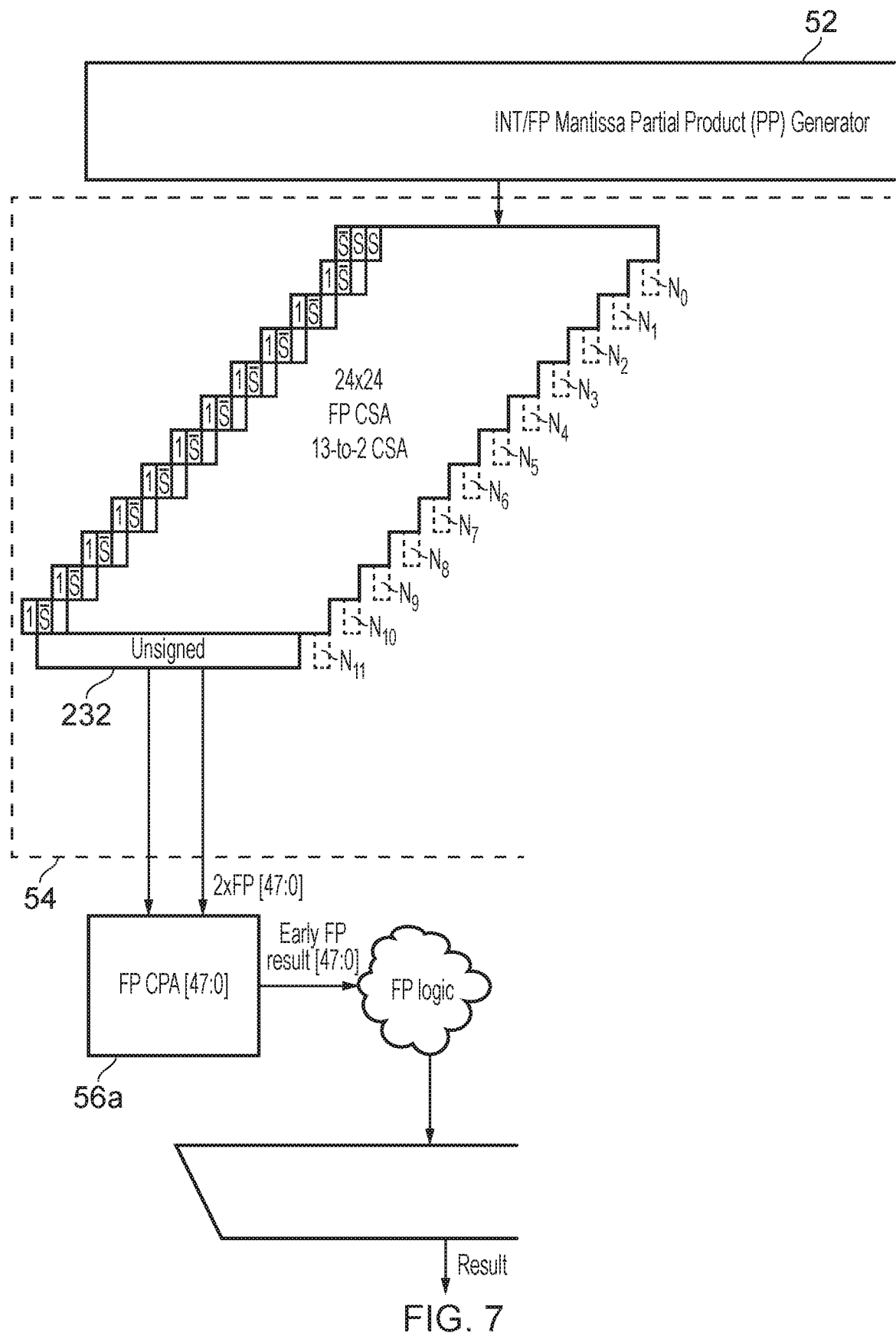
FIG. 7 illustrates a multiplier circuit in accordance with some examples.
Figure 7:
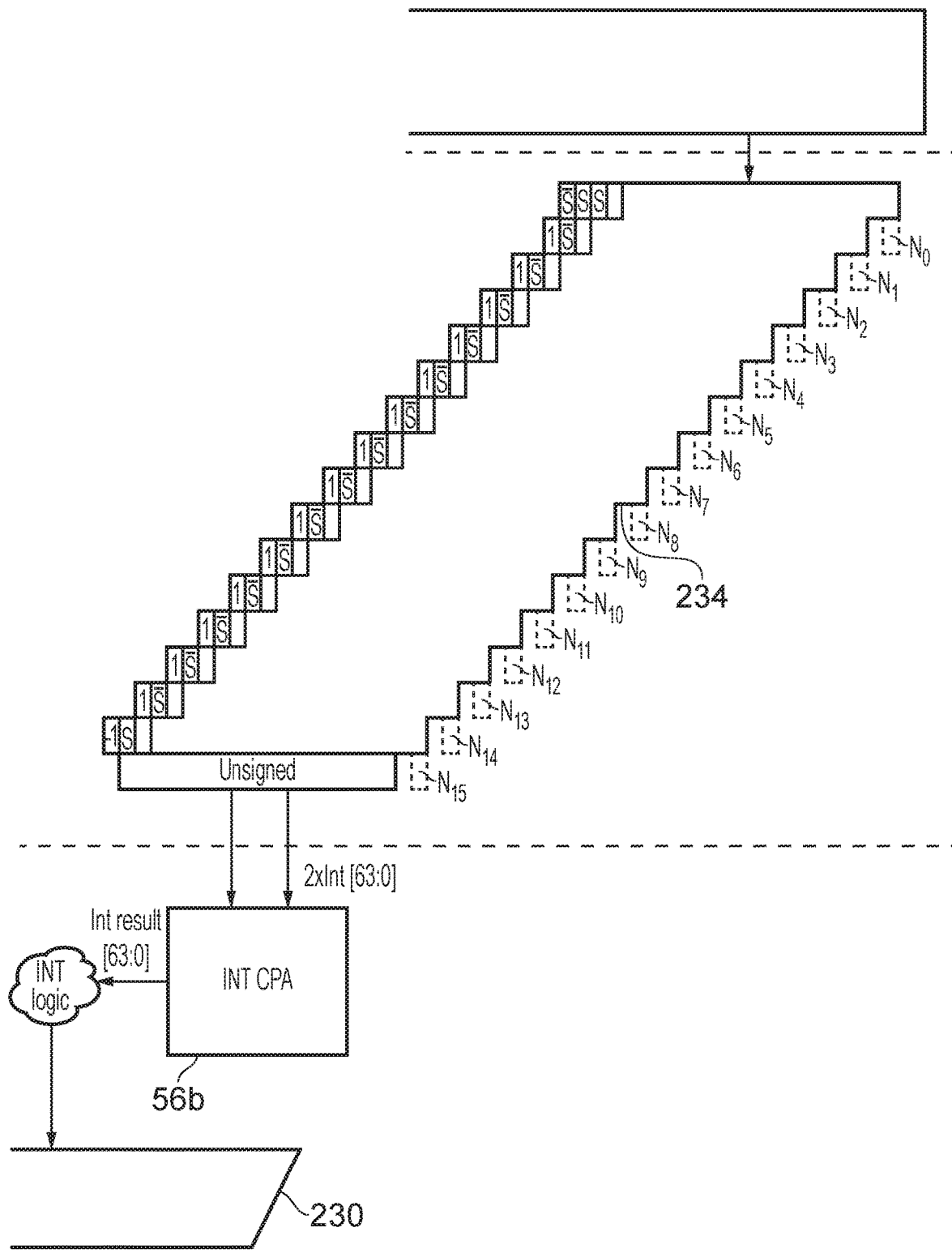

FIG. 7 illustrates another example in accordance with some embodiments. In the example of FIG. 7, completely separate CSA networks 232, 234 are provided for smaller (e.g. mantissa) multiplication 232 and for larger (e.g. 32-bit integer) multiplication 234. Each network then provides the result in redundant format to a CPA 56a, 56b, which adds the values together to provide a result in non-redundant form. The non-redundant FP result then passes through FP logic (e.g. in order to perform operations such as rounding) before the result is passed to a multiplexer 230 (which is an example of selection circuitry). Similarly, the non-redundant integer result passes through integer logic before being passed to the multiplexer 230. The FP logic is more complex than the integer logic and thus takes more time to process results. However, this is compensated for by the FP CSA network 232 being smaller and faster than the integer CSA network 234. Consequently, integer and floating point results are received by the multiplexer 230 at approximately the same time so that the multiplexer 230 can select between any provided results. Note that the unused CSA network and its associated CPA can also be powered down using power control circuitry 208 as previously described.

The multiplication circuitry can take the form of SIMD (Single Instruction Multiple Data) multiplication circuitry in which a single instruction is performed on several items of data simultaneously. In particular, the multiplication of a single 32-bit number by another 32-bit number can be performed in order to evaluate the results of two 16×16 bit multiplications or four 8×8 bit multiplications for instance. Such a technique makes use of the observation that if for two 32-bit values a and b:

$$a = a_1 \text{ concat } a_2 = a_1 * 2^{16} a_2$$

$$b = b_1 \text{ concat } b_2 = b_1 * 2^{16} b_2$$

then if $a_1$, $a_2$, $b_1$, and $b_2$ are treated as separate 16-bit values:

$$a*b = ((a_1 * 2^{16}) + a_2)((b_1 * 2^{16}) + b_2)$$
$$= ((a_1 * 2^{16})(b_1 * 2^{16}) + (a_1 * 2^{16})b_2 + a_2(b_1 * 2^{16}) + a_2 b_2)$$
$$= a_1 b_1 * 2^{32} + (a_2 b_1 * 2^{16}) + a_2 b_2$$

The evaluation of a*b therefore contains the results of $a_1 b_1$ and $a_2 b_2$.

Figure 8:
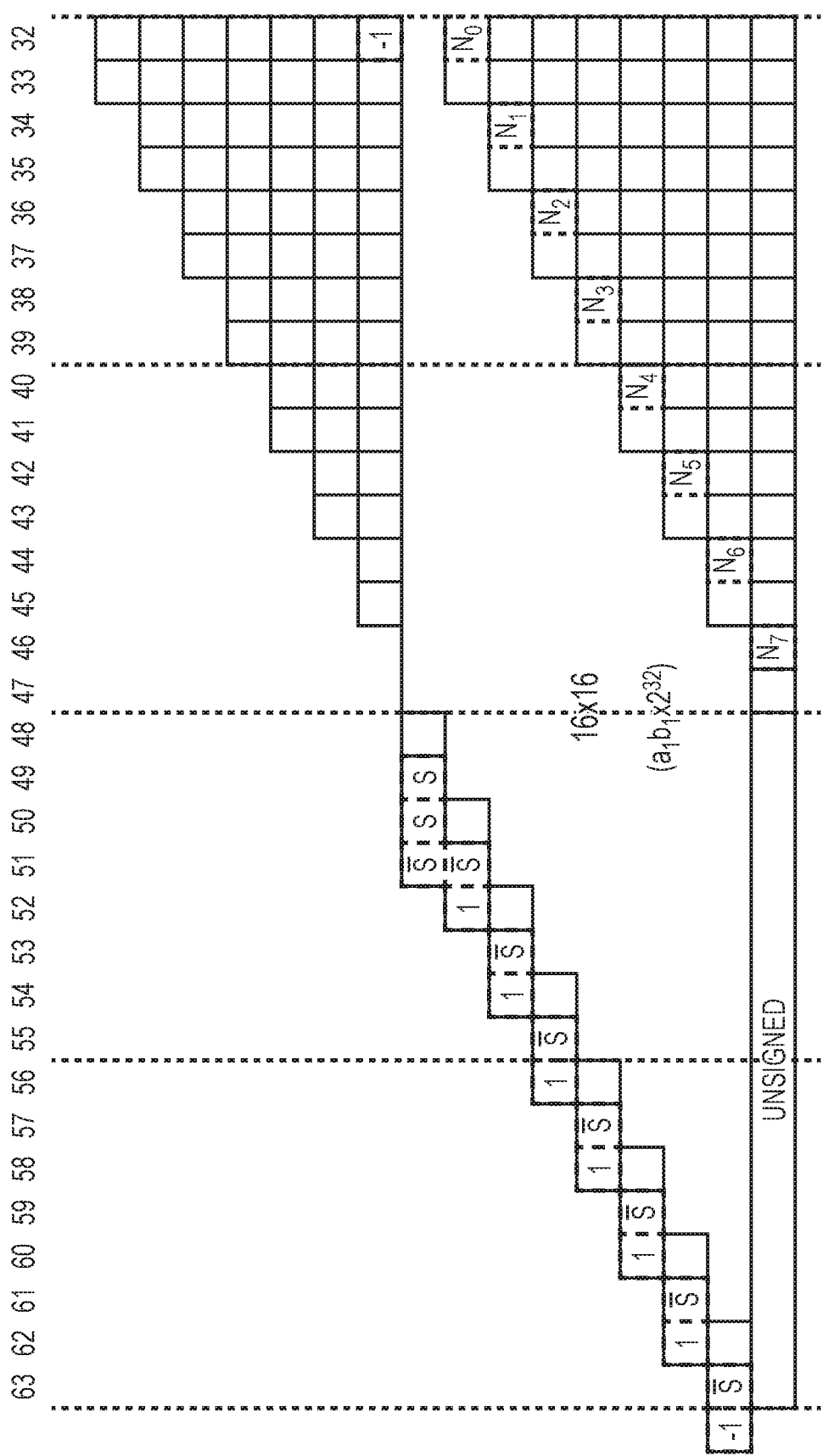
FIG. 8 illustrates how a SIMD 32×32 bit multiplier can be used to perform two 16×16 bit multiplications.
Figure 8:
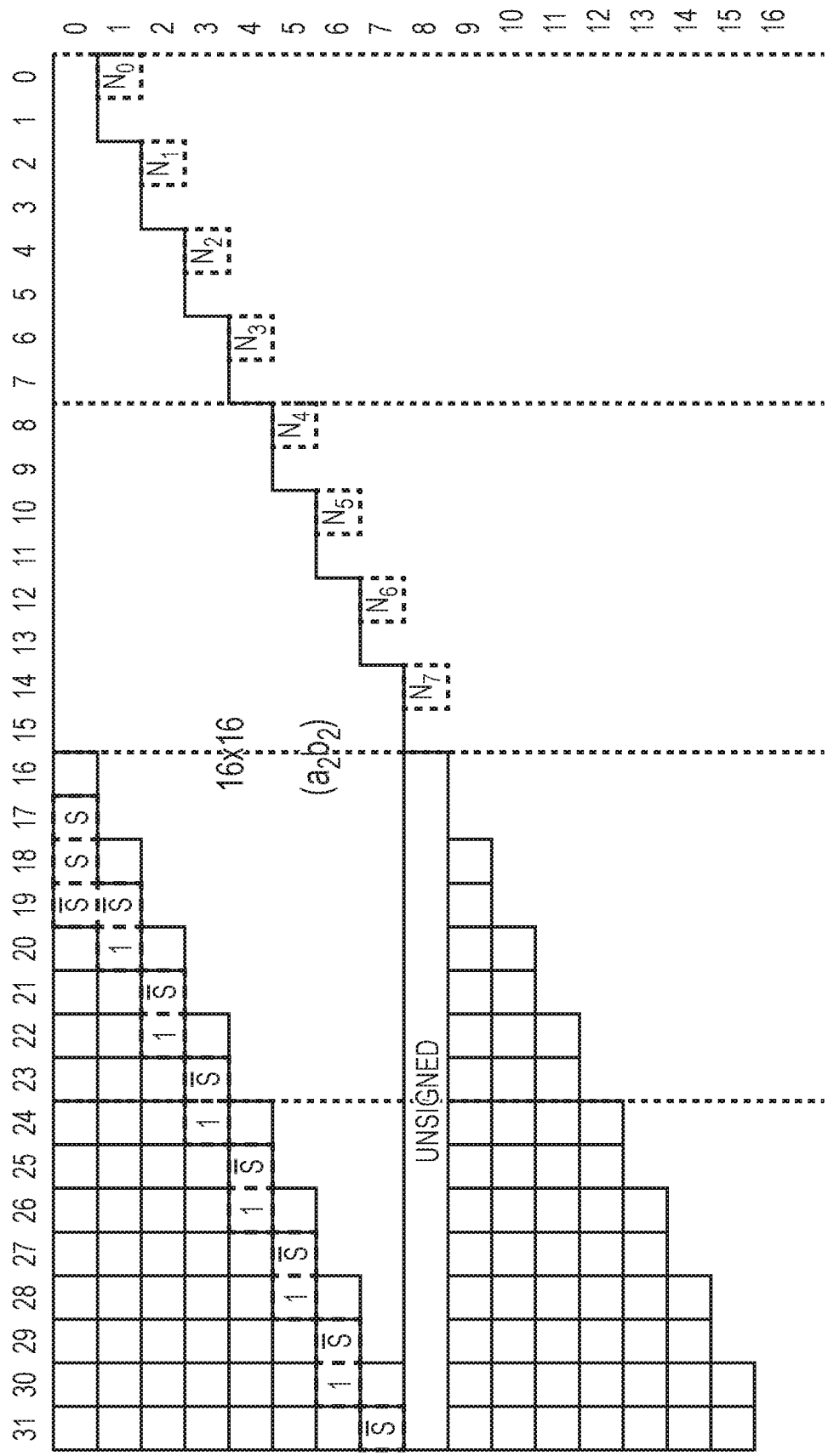

This is illustrated in FIG. 8, which shows how the parts of the partial products for a 32×32 bit multiplication, each made up of two 16-bit numbers ($a_1$, $a_2$, $b_1$, $b_2$) can be extracted to determine the results of the two multiplications $a_1 b_1$ and $a_2 b_2$. A similar technique can be used to determine the results of four 8×8 bit multiplications. Note that in this situation, the operands that are being multiplied and are being used to generate the partial products are still 32-bits, even though only part of the partial products are actually considered to be of use for the underlying (e.g. 16×16 bit) multiplications that are of interest. The full technique for this is not material to the present disclosure, but is more fully described in U.S. patent application Ser. No. 16/105,066 filed on 20 Aug. 2018, the contents of which are incorporated herein.

Figure 9:
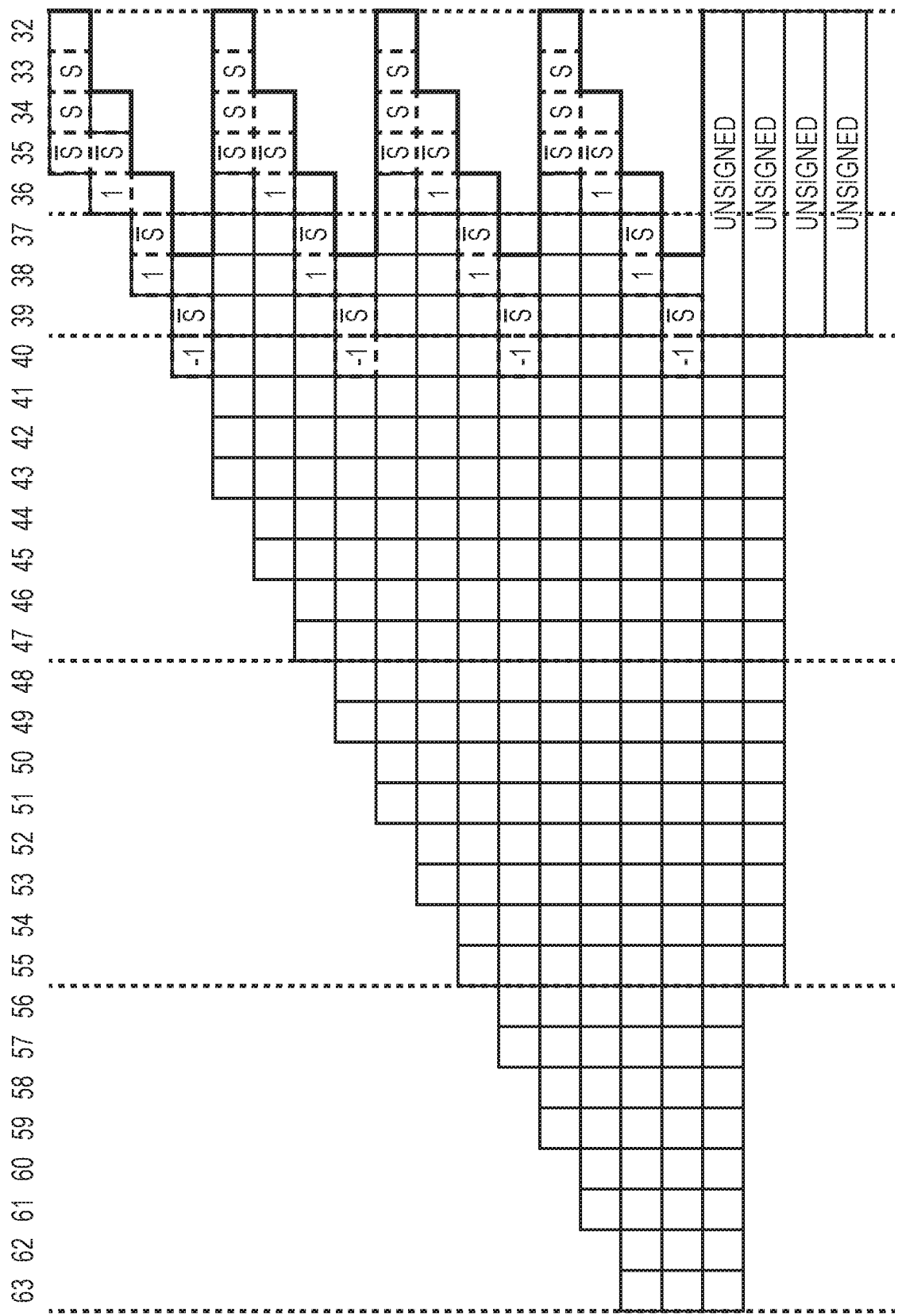
FIG. 9 shows how a SIMD multiplier can be used to perform stacking in order to perform multiply-accumulate.
Figure 9:
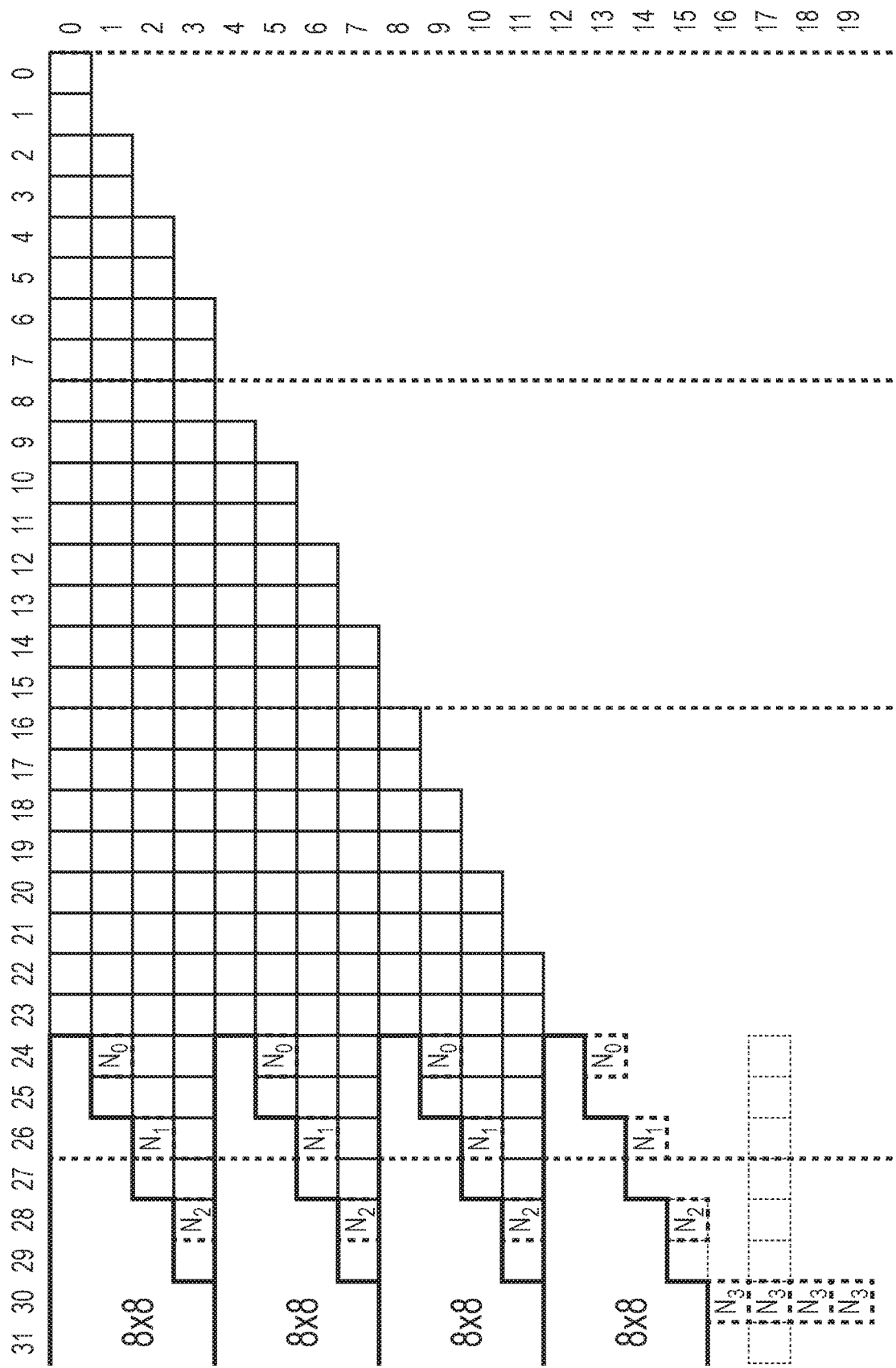

FIG. 9 illustrates a special case of using SIMD multiplication circuitry for the purposes of four 8×8 bit multiplications, the results of which are then accumulated together (e.g. a*b+c*d+e*f+g*h). This operation is known as a multiply-accumulate operation across vector. Here, the parts of the generated partial products that represent the results of the 8×8 bit multiplications are stacked so that bits of the same relevance are found in the same lanes or columns of the SIMD circuitry. This allows the CSA network and partial product generators to be reused for the multiply accumulate operation across vector. The result needs to be shifted to the right since bit 0 of the result is stored as bit 24 in the CSA tree. Again, the full technique for this is not material to the present disclosure, but is more fully described in U.S. patent application Ser. No. 16/105,066 filed on 20 Aug. 2018, the contents of which are incorporated herein.

A drawback to this situation is that more partial products are generated. This situation arises because the conversion bits that are used to perform the unsigned to signed conversion are placed at a certain level of significance. In the non-stacked example of FIG. 8, the bits can be placed so as to occlude part of another partial product because the part of the partial product that is being occluded is not of interest for the results of the 16×16 bit multiplications being performed. Such occlusion cannot occur in the example of FIG. 9 (due to the stacking), since the occlusion would cause a relevant part of the one of the partial products to be affected. As a consequence, additional partial products are generated, to perform the signed to unsigned conversions. This, in turn, extends the size of the CSA network that is necessary. As can be seen in the case of FIG. 9, 20 partial products are generated for the stacked 8×8 bit example. This would necessitate (from FIG. 4) a CSA network having a height of 7. This in turn would slow down the rate at which multiplications can be performed, which might result in timings being missed in the case of floating-point multiplication. Hence, by using the present techniques of using different numbers (e.g. different numbers of layers) of CSAs for each situation, the timing constraints for floating-point multiplication can still be met, while still enabling SIMD multiplication to occur on integers.

Figure 10:
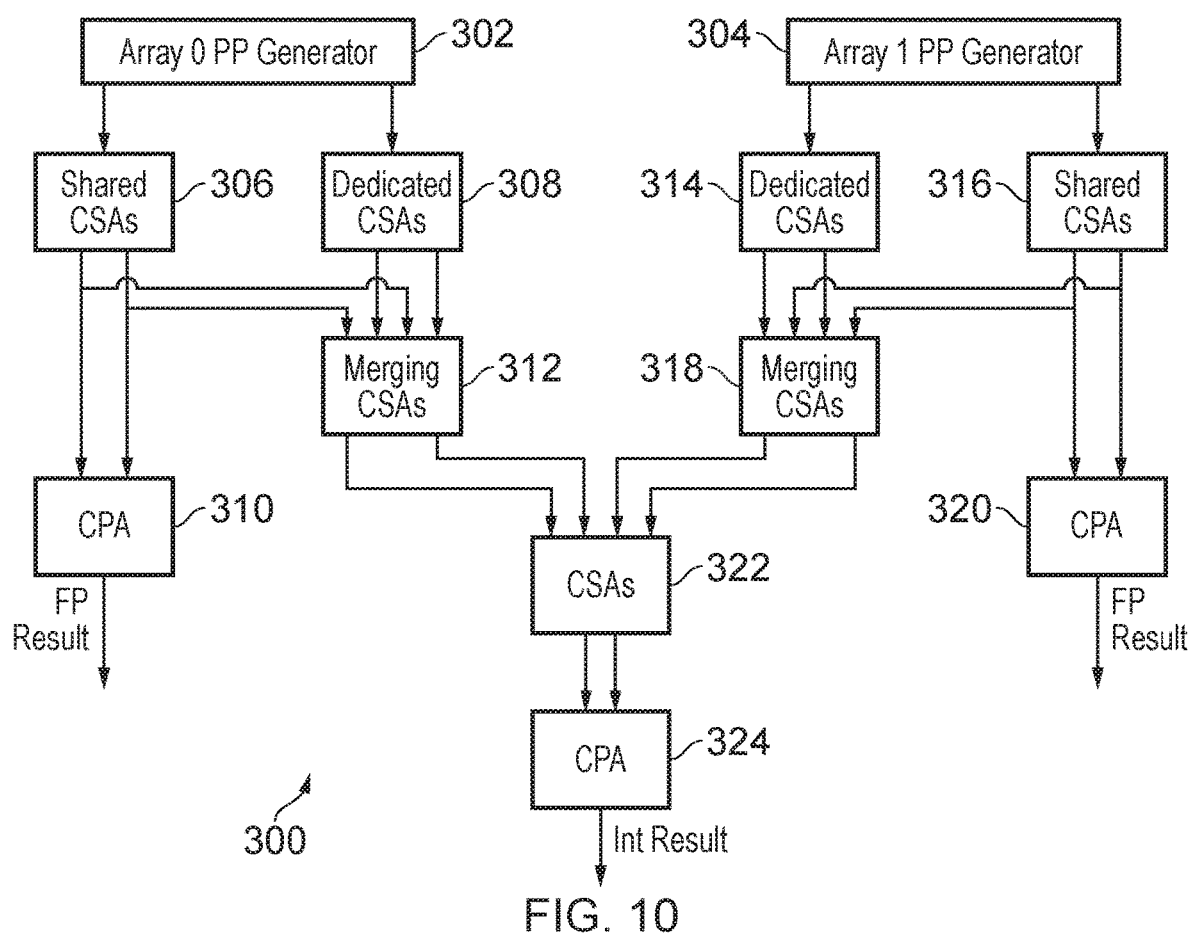
FIG. 10 schematically illustrates an apparatus for performing 64×64 bit multiplication by using multiple circuits for performing 32×32 bit multiplication.

It will be appreciated that the above techniques can also be used in order to achieve a two 32×32 bit multiplication or multiply accumulate operation (e.g. as for a 64-bit vector) by using two multiplication circuits. Similarly, this can be used to perform four 16×16 (stacked) multiply (accumulation) operations or eight 8×8 (stacked) multiply (accumulation) operations. An example of such an apparatus 300 is illustrated with respect to FIG. 10. Here, a first generator 302 is used to generate partial products in respect of a multiplication between a first 32-bit number of the first 64-bit vector and a first 32-bit number of the second 64-bit vector. Meanwhile a second generator 304 is provided to generate partial products in respect of a multiplication between a second 32-bit number of the first 64-bit vector and a second 32-bit number of the second 64-bit vector. The partial products are added together using shared CSAs 306316 and dedicated CSAs 308, 314. The shared CSAs 306, 316 are configured so that they can also quickly add partial products that are generated in respect of smaller multiplications (such as for mantissas of floating-point numbers, where fewer partial products are generated). Where this occurs, CPAs 310, 320 is provided in order to quickly convert these results into non-redundant form. Where a larger multiplication occurs (such as for the two 32-bit multiplications being described), the results of the shared CSAs 306, 316 are merged with the dedicated CSAs 308, 314, using merging CSAs, each of which reduces four results to two. The two sets of merged results are then merged again using another CSA network 322 in order to produce a final result in redundant representation. This can then be converted to non-redundant representation using a CPA 324.

Such an apparatus makes it possible to perform 32-bit multiplications of numbers in 64-bit vectors while still enabling the fast generation of results of smaller multiplications (such as floating-point mantissas).

Figure 11:
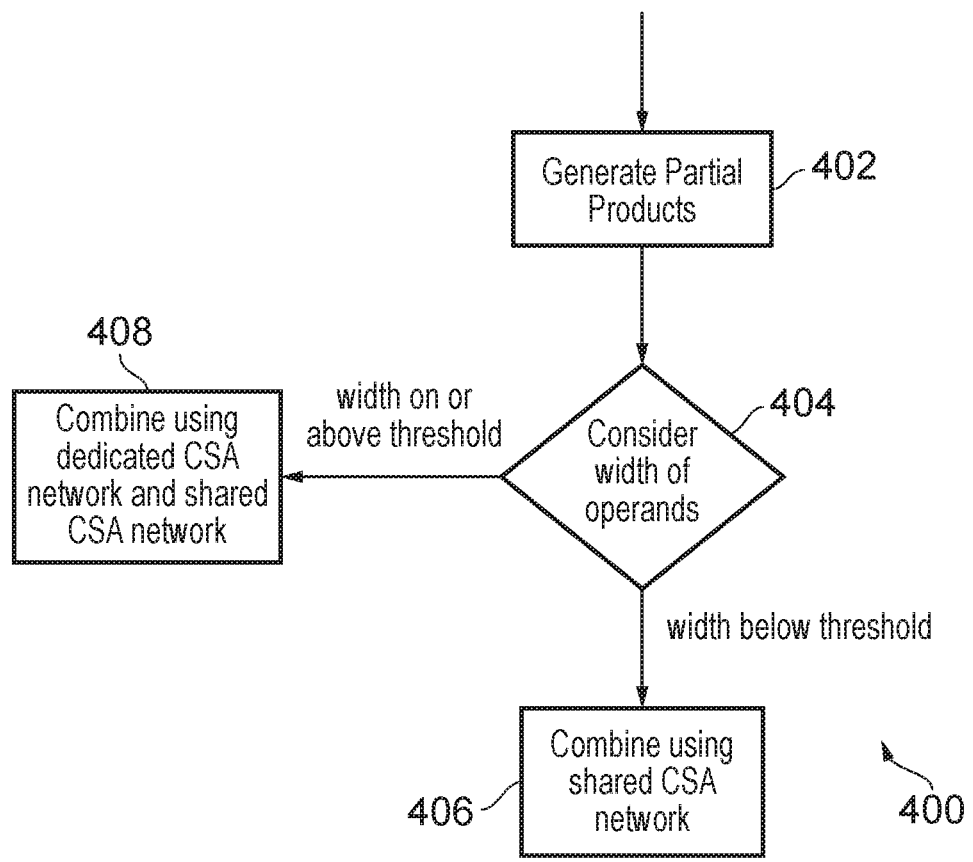
FIG. 11 is a flow chart that illustrates a method of performing multiplication in accordance with some embodiments.

FIG. 11 is of a flow chart that illustrates a method of performing multiplication in accordance with some examples. The process begins at step 402 where two operands are multiplied together in order to form partial products. At a step 404, a width of the operands for which the partial products have been generated is considered. For instance, a smaller of the widths might be considered. If the width is on or above a threshold then at step 408, both the dedicated CSA network and the shared CSA network are used in order to add the partial products together. Otherwise, at step 406, the shared CSA network is used without the dedicated CSA network being used. In this latter case, the number of layers of CSA that the result is generated through is smaller. Consequently, the result is produced more quickly than if both the dedicated CSA network and the shared CSA network are used.

It is hence demonstrated how, shared circuitry can be provided for performing integer and floating-point multiplication where the circuitry is able to produce results more quickly in the case of floating-point multiplication or for other forms of multiplication where a width of the operands is smaller.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A multiplier circuit to multiply a first operand and a second operand, the multiplier circuit comprising:
    a carry-save adder network comprising a plurality of carry-save adders to perform partial product additions to reduce a plurality of partial products to a redundant result value that represents a product of the first operand and the second operand, wherein:
    a number of the carry-save adders that is used to generate the redundant result value is controllable and is dependent on a width of at least one of the first operand and the second operand;
    the plurality of carry-save adders used to generate the redundant value are arranged in the carry-save network as a plurality of serialized chains; and
    a length of the serialized chains reduces as the width of the at least one of the first operand and the second operand reduces.

2. The multiplier circuit according to claim 1, wherein the carry-save adder network comprises a first set of the carry-save adders and a second set of the carry-save adders; and
    the number of the carry-save adders that is used to generate the redundant result value is controllable by which of the first set of the carry-save adders and the second set of the carry-save adders to use to generate the redundant result value.

3. The multiplier circuit according to claim 2, comprising:
    combination circuitry to selectively combine a first output from the first set of the carry-save adders and a second output from the second set of the carry-save adders, in dependence on the width of the at least one of the first operand and the second operand, wherein
    the first set of the carry-save adders and the second set of the carry-save adders are adapted to operate in parallel with each other.

4. The multiplier circuit according to claim 3, wherein the second set of the carry-save adders is used to generate the redundant result value regardless of the width of the at least one of the first operand and the second operand; and
    the first set of the carry-save adders is used to generate the redundant result value in dependence on the width of the at least one of the first operand and the second operand.

5. The multiplier circuit according to claim 2, comprising:
    selection circuitry to receive a first candidate redundant result value from the first set of the carry-save adders and a second candidate redundant result value from the second set of the carry-save adders and to select between the first candidate redundant result value and the second candidate redundant result value as the redundant result value.

6. The multiplier circuit according to claim 2, comprising:
    power control circuitry to disable the first set of the carry-save adders to control the number of the carry-save adders that is used to generate the redundant result value.

7. The multiplier circuit according to claim 1, wherein the number of the carry-save adders that is used to generate the redundant value reduces as the width of the at least one of the first operand and the second operand reduces.

8. The multiplier circuit according to claim 1, wherein the multiplier circuit is a shared multiplier circuit to perform multiplication on both integers and at least part of floating-point numbers.

9. The multiplier circuit according to claim 8, wherein when the at least one of the first operand and the second operand comprises a mantissa of a floating-point number, the number of the carry-save adders is smaller than when both the first operand and the second operand are integers.

10. The multiplier circuit according to claim 1, wherein the multiplier circuit is a SIMD multiplier circuit to perform multiplications between a vector of first operands including the first operand and a vector of second operands including the second operand, to produce a plurality of redundant result values including the redundant result value; and
    a subset of the partial products relate to a product of one element of the vector of first operands and one element of the vector of second operands.

11. The multiplier circuit according to claim 10, wherein the multiplier circuit is a SIMD multiply accumulate circuit; and
    results of the multiplications are added together.

12. The multiplier circuit according to claim 11, wherein the results of the multiplications are bit-aligned with each other such that the results are stacked.

13. The multiplier circuit according to claim 1, comprising:
    a carry-propagate adder to convert the redundant result to a non-redundant result.

14. The multiplier circuit according to claim 1, wherein each of the partial products represents a product of one element of the first operand with one element of the second operand.

15. A data processing apparatus comprising the multiplier circuit according to claim 1.

16. A method of multiplying a first operand and a second operand, the method comprising:
    performing, using a carry-save adder network comprising a plurality of carry-save adders, partial product additions to reduce a plurality of partial products to a redundant result value that represents a product of the first operand and the second operand, wherein:

a number of the partial product additions that is used to generate the redundant result value is controllable and is dependent on a width of at least one of the first operand and the second operand;

the plurality of carry-save adders used to generate the redundant value are arranged in the carry-save network as a plurality of serialized chains; and a length of the serialized chains reduces as the width of the at least one of the first operand and the second operand reduces.

17. A multiplier circuit to multiply a first operand and a second operand, the multiplier circuit comprising:

means for performing partial product additions to reduce a plurality of partial products to a redundant result value that represents a product of the first operand and the second operand, wherein a number of the means for performing partial product additions that is used to generate the redundant result value is controllable and is dependent on a width of at least one of the first operand and the second operand;

the means for performing partial product additions are arranged as a plurality of serialized chains; and a length of the serialized chains reduces as the width of the at least one of the first operand and the second operand reduces.

* * * * *